United States Patent [19]

Diesing et al.

[11] Patent Number: 5,269,722
[45] Date of Patent: Dec. 14, 1993

[54] METHOD FOR FILLETING POULTRY BODIES

[76] Inventors: Karl-Heinz Diesing, Heimstätten 21, 2400 Lübeck 1; Peter Groth, Berkenbusch 18, 2418 Ratzeburg; Wolfgang Wagner, Sonnentauweg 21, 2067 Reinfeld, all of Fed. Rep. of Germany

[21] Appl. No.: 979,150

[22] Filed: Nov. 23, 1992

Related U.S. Application Data

[63] Continuation-in-part of Ser. No. 668,088, Mar. 12, 1991, abandoned.

[30] Foreign Application Priority Data

Mar. 19, 1990 [DE] Fed. Rep. of Germany ....... 4008719

[51] Int. Cl.⁵ .............................................. A22C 21/00
[52] U.S. Cl. .................................... 452/135; 452/136; 452/125; 452/127; 452/165
[58] Field of Search ............... 452/135, 136, 107, 125, 452/127, 165

[56] References Cited

U.S. PATENT DOCUMENTS

| | | | |
|---|---|---|---|
| 4,567,624 | 2/1986 | Vanmil | 452/136 |
| 4,688,297 | 8/1987 | Bartels | 452/135 |
| 4,827,570 | 5/1989 | Scheier et al. | 452/136 |
| 4,951,354 | 8/1990 | Callsen et al. | 452/136 |
| 4,993,114 | 2/1991 | Meyer et al. | 452/136 |

Primary Examiner—Willis Little
Attorney, Agent, or Firm—Thomas R. Morrison; George J. Brandt, Jr.

[57] ABSTRACT

A method for mechanically detaching the meat from the bodies of slaughtered poultry in the form of fillets is performed with a starting product in the shape of a so called "front-half", i.e. a body portion obtained by a cross-section made obliquely through the poultry body. From this body portion the pelvis has been severed together with the legs, and by a further step the wings have been severed. The treatment in individual processing steps, the performance of which is limited to very narrowly restricted working areas by means of tools which can thus be adapted without compromise to the anatomically conditioned circumstances. Moreover, the sequence of the processing steps is selected such that the increasing destabilization of the poultry body is controlled with each processing step so that the respective subsequent working steps are influenced in a minimum manner possible. The result is a high yield in fillet meat of excellent quality.

5 Claims, 2 Drawing Sheets

METHOD FOR FILLETING POULTRY BODIES

BACKGROUND OF THE INVENTION

This application is a continuation-in-part of application Ser. No. 07/668,088 filed Mar. 12, 1991, now abandoned.

FIELD OF THE INVENTION

The invention relates to a method for processing the bodies of slaughtered poultry, by mechanically detaching the meat therefrom in the form of fillets.

PRIOR ART

For such processing, poultry bodies are conventionally provided by way of a starting product known as "front half", which comprises a body portion defining a plane of symmetry and produced by a cross-cut extending obliquely through the poultry's body and severing the pelvis together with the legs. However, the wings have been removed from the thus produced body portion, which consequently comprises essentially the chest (thorax); the corresponding part of the vertebral column (columna vertebralis); the ribs (costae); the breastbone (sternum) comprising the breastbone crest (crista sterni) and the breastbone plate (corpus sterni); the coracoids (coracoidae) carried by the breastbone and including the wing joints and the wishbone (clavicula); as well as the shoulder-blades (scapulae). This body portion is conveyed while being mounted in a saddled or cap-like manner with said wing joints leading and essentially parallel to the plane of symmetry.

In such processing of poultry bodies, it is a main aspect particularly with regard to economy to maximize the yield in high quality fillet meat, which means that the amount of meat remaining on the carcass is held at the minimum possible. Simultaneously, consumers attach great importance to an agreeable appearance of the meat piece thus gained, which appearance essentially depends on the smoothness of the severing surfaces.

OBJECT OF THE INVENTION

It is the main and essential object of the present invention to realize these aspects and aims in an optimal manner.

SUMMARY OF THE INVENTION

In a method for processing the bodies of slaughtered poultry, by mechanically detaching the meat therefrom in the form of fillets, which poultry bodies are provided by way of a starting product known as "front-half", which comprises a body portion defining a plane of symmetry and produced by a cross-cut extending obliquely through the poultry's body and severing the pelvis together with the legs, and with the wings having been removed from the thus produced body portion, which is conveyed while being mounted in a saddled or cap-like manner with the wing joints leading and essentially parallel to said plane of symmetry, this object is achieved in that the processing comprises the steps of a) detaching the skin covering the back area from the back meat present there, and severing the skin in the area of the vertebral column;

b) detaching the meat from the wishbone by scraping along the outer contour thereof;

c) detaching the meat portions attached to the leading part of the wing joint;

d) detaching the meat portions attached to the ribs in the back region, from the parts of the ribs present in this area, and from the shoulder-blades;

e) detaching the meat portions attached to the remaining parts of the ribs and on the breastbone plate from these skeleton parts; and f) finally tearing-off the fillets from the crest of the breastbone.

The main advantages to be obtained by this method essentially consist in that the design of the processing tools can be concentrated, without compromise, on the limited areas of treatment requiring attention, respectively, i.e. on the very specific circumstances based particularly on the anatomy and present in the respective areas of treatment.

Thus, a very precise design and controlling of the processing tools can be realized, which has the effect of a high yield in fillet meat, having relatively smooth and thus appealing severing surfaces.

According to an advantageous development of the present invention, there may be provided a processing step a') occurring between said steps a) and b) and comprising the removing of the skin in its entirety by seizing the skin in the region of the crest of the breastbone. Also, it is regarded expedient that the processing position of the poultry bodies during the processing steps is defined such that the lifting of the respective meat portions is supported by gravity.

BRIEF DESCRIPTION OF THE DRAWINGS

Other and further objects of the present invention will be apparent from the following description and claims and from what is illustrated in the accompanying drawings which by way of illustration schematically show a preferred embodiment of the present invention and the principles thereof and what now are considered to be the best modes contemplated for applying these principles. Other embodiments of the invention embodying the same or equivalent principles may be used and structural changes may be made as desired by those skilled in the art with-out departing from the present invention and the scope of the appended claims. In the drawings.

DETAILED DESCRIPTION OF THE PREFERRED EMBODIMENT

For obtaining a general view, there is initially shown the anatomic structure of a poultry body with regard to those parts thereof which are of essential importance in carrying out the processing method according to the present invention.

Figure 1:
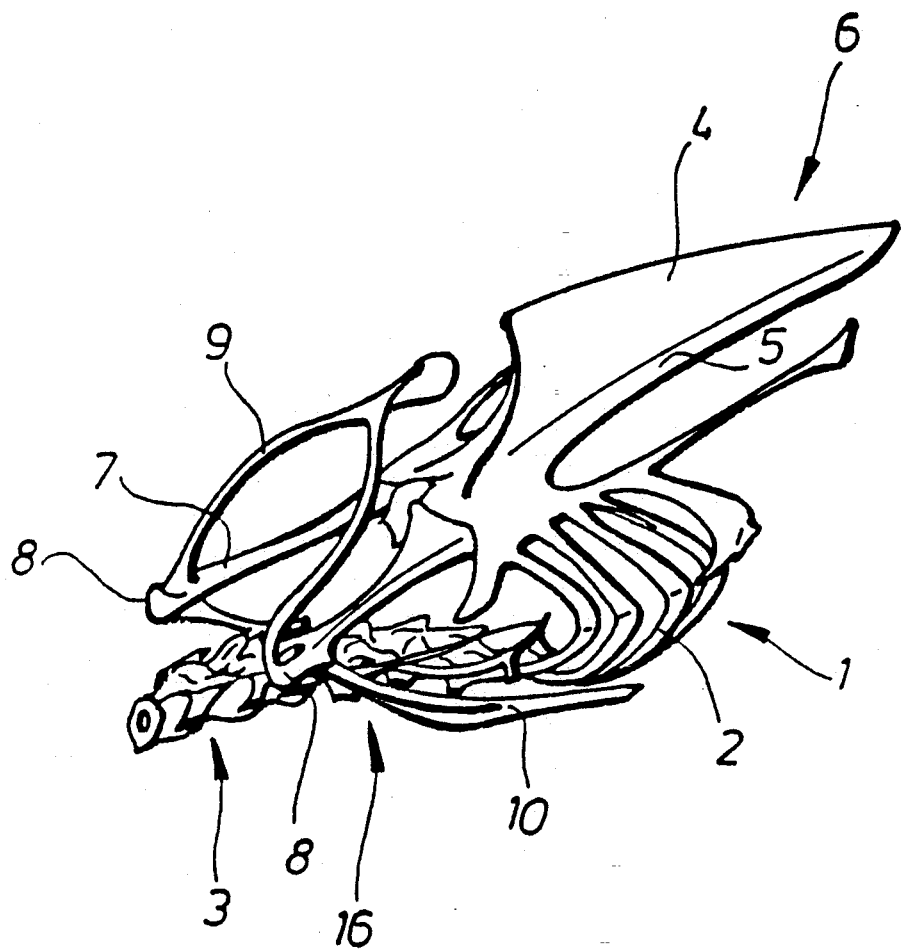
FIG. 1 shows an axonometric representation of a poultry carcass and FIG. 2 shows a side view of an apparatus for performing the method according to the present inventions by way of a schematic representation.
Figure 2:
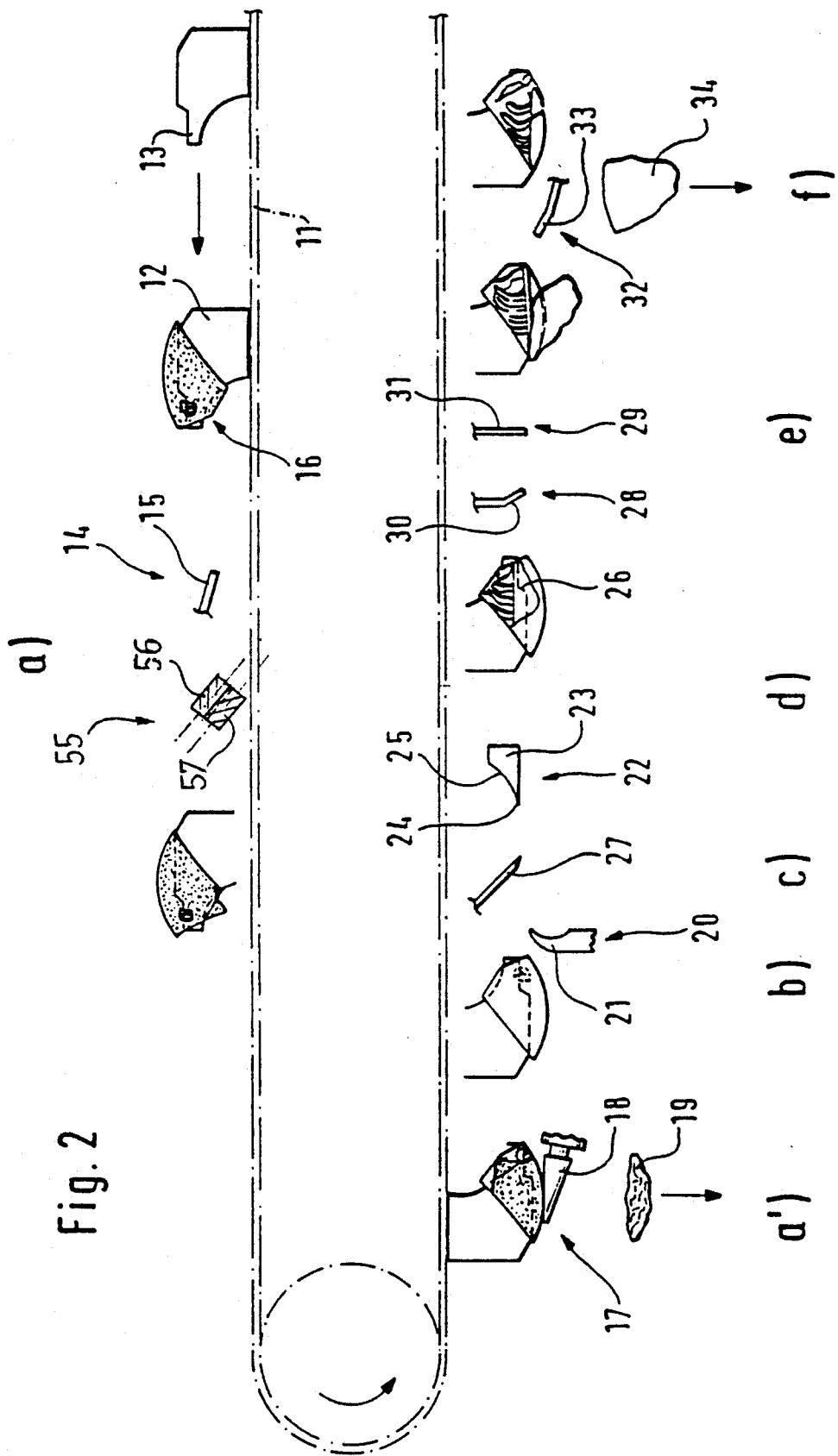

This can be limited to that part of the poultry body presented in FIG. 1. This portion of the poultry body or carcass is called "front-half" by experts and is produced by a cross-section extending obliquely through the body, the pelvis together with the legs having been severed. In the present case, the wings also have been removed, preferably by performing the cut through the boneless space between the wing-body joint and the upper arm bone of the wing.

The carcass of the poultry body portion to be treated thus comprises essentially the chest 1 (thorax) with the ribs 2 (costae), the portion of the vertebral column 3

(columna vertebralis) passing there through, the breastbone 6 (sternum) including the breastbone crest 4 (crista sterni), the breastbone plate 5 (corpus sterni), and the following coracoids 7 (coracoidae) with the wing points 8 at their free ends, at which the wishbone 9 (clavicula), on the one hand, and the shoulder-blades 10 (scapulae), on the other, start.

For the purpose of processing in accordance with the present invention such a "front-half" is mounted or capped on a conveyor 11 driven to rotate in a suitable manner. This conveyor is arranged in the not-shown frame of a processing machine and is bordered by a series of tools which perform the individual steps of the method according to the invention and which, for this purpose, are designed in an appropriate manner and controlled synchronously with the movement of the conveyor 11. The tools are arranged in pairs to both sides of the plane of symmetry of conveying saddles 12 of the conveyor. The individual tool elements of each processing tool are controlled such that their horizontal motion components are created to be in synchronism with each other but in opposite directions to each other, whereas the vertical components are produced to be synchronous and in the same direction with each other.

The conveyor 11 comprises an endless guided chain which is equipped with the aforementioned conveying saddles 12, each of which has a saddle horn 13 forming its leading end.

The mounting of a "front-half" on a conveying saddle 12 is performed by "capping", i.e. as if a cap or hat were laced on the saddle. Such that the saddle horn penetrates into the chest 1 and the breastbone plate 5 is carried by the back of the saddle. The conveying thus occurs with the head end of the vertebral column 3 pointing in the direction of conveyance and with the breast portion facing upwards and the back portion 16 downwards. The "front-half" is fixed with regard to the longitudinal direction by the engagement of the vertebral column 3 on the saddle, this position being expediently fixed additionally by a not-shown clamping mechanism which is arranged on the conveying saddle 12 in order to make sure that the forces produced during processing can be received and absorbed.

The poultry body which has been prepared in the described manner is advanced by the conveyor 11 and arrives in the working or operative region of the tools 14 carrying out the processing step a).

These tools 14 comprise a pair of spreading fingers 15 which are directed counter to the conveying direction. These fingers penetrate, in the region of the neck opening, between the skin and the meat attached in the back area 16, which penetration occurs beneath the saddle horn 13. The fingers lift the skin by being moved laterally under control and by being guided in accordance with the contour. The tips of the spreading fingers 15 finally emerge in the region of the cutting plane by which the "front-half" has been produced. Simultaneously, the spreading fingers 15 are controlled to move into a spreading position which finally effects that the skin bridge is torn at its weakest position above the vertebral column 3 due to over-stretching.

Instead of using spreading fingers 15, a skinning tool 55 comprised of paired rollers 56, 57 can, and preferably is, used. A cam 58 can be used to move the rollers into contact with the poultry body where same grip the skin in the region of the neck opening and pull it upwardly to partly tear it from the body, this normally happening in the region above the vertebral column.

With the skin thus partially detached the poultry body now arrives in the lower run of the conveyor 11 and, in particular, initially in the operative area of a tool 17 carrying out the processing step a'). This processing tool 17 comprises a pair of toothed conical rollers 18 rotating in opposite directions relative to each other, which rollers draw in the skin 19 between them and pull it off as a whole and untorn piece due to the preparation by the tool 14.

The skinned poultry body subsequently enters the working area of a tool 20 performing the processing step b). This tool comprises a pair of knife blades 21 which are guided along the outer contour of the wishbone 9 starting in the region of the wing joints 8, and detach the wishbone from the meat.

The following processing step c) is performed by a pair of knife blades 27 which detach the meat portions attached in the region of the wing joints 8, for which purpose the knife blades are moved inwardly into a working position for a short time and in a controlled manner.

The next processing step d) is performed by a tool 22. This comprises a pair of scraping blades 23, which are adapted to the bulging of the poultry body by a concave profile. Each of the scraping blades 23 is provided with a tip 24 facing counter the conveying direction and with a scraping edge 25, which follows the tip 24 and recedes in a plough manner. The arrangement of the scraping blades 23 is such that, together with their tips 24, they penetrate or immerse into the meat in their basic position immediately below the wing points 8 and in the plane of the outer flank of the shoulder-blades 10 which start in this position and extend along the vertebral column 3. The scraping blades 23 are controlled such that they slide along the shoulder-blades 10 and thereby detach the meat portions which are attached to those parts of the ribs 2 which are present there and follow the vertebral column 3.

After this processing step the meat portions 26 present in the back area have been detached from the carcass and they hang downwardly from the flanks of the poultry body by the effect of gravity.

The thus prepared poultry body now arrives in the operative area of the tool 28 and/or 29 carrying out the processing step e). These tools comprise pairs of scraping fingers 30 and 31, respectively, which initially lift the meat portions attached to the coracoids 7 and the still covered parts of the ribs 2 and, thereafter, the portions on the breastbone plate 5.

The meat has then been detached from the carcass to an extent that it is merely attached to the crest 4 ox the breastbone 6. This connection is severed by means of processing step f), for which purpose a tool 32 comprise in a pair of scraping fingers 33 is utilized. While the gained meat portion falls down as a double fillet 34, the carcass is ejected from the conveying saddle 12 in an appropriate manner, so that a new cycle can be started.

The process according to the present invention also guarantees a high yield and quality of the product insofar as the selected and predetermined sequence of the processing steps is based on the aim to perform a control in accordance with the reduction in the stability of the carcass, which reduction results from the progressing treatment of the carcass, so that the respective subsequent working steps are only affected in the minimum manner possible.

What is claimed is:

1. A method for removing meat in fillet form from a skin covered poultry portion which is a front half of a slaughtered poultry body subjected to a cut extending obliquely therethrough severing pelvis and legs therefrom, wings having been removed from the poultry portion so that same is comprised of a chest part, a vertebral column part, ribs, a breastbone including a breastbone crest and a breastbone plate, coracoids carried by the breastbone, said coracoids including wing joints to which a wishbone is joined, and shoulder blades, said method comprising:

supporting the poultry portion on a saddle having a plane of symmetry and carried by a conveyor moving along conveyor travel direction and having a second opposite conveyor travel direction, the poultry portion being supported such that the wing joints and vertebral column are in leading position in the direction of conveyor travel with the breastbone facing upward and an oppositely located back area facing downward, engaging the poultry body with skinning tools from locations at each side of the said plane of symmetry in the body back area as the saddle is moving in a conveyed travel direction to cause detachment of the back area skin from back area meat at each side of the said plane of symmetry and a tearing of skin proximal the vertebral column, detaching meat from the wishbone with a scraping tools at each side of the said plane of symmetry which tools move against an outer contour of the wishbone, and detaching meat attached to wing joint leading parts with tools at each side of the said axis of symmetry, thereafter and while the saddle is moving in the conveyor second travel direction, carrying out the successive steps of detaching meat attached to ribs in the back area and from the shoulder blades with tools located at each side of the said axis of symmetry, detaching meat attached to remaining rib parts and the breastbone plate with tools located at each side of the said axis of symmetry, remaining attached meat on the poultry body being that attached to the breastbone crest, and tearing off the meat attached at the breastbone crest which meat and that detached in prior steps constitutes a double fillet form of meat.

2. The method of claim 1 in which prior to detaching meat from the wishbone but following tearing of skin proximal the vertebral column, the skin on the poultry portion is removed in its entirety with pulling force applied thereto in the region of the breastbone crest.

3. The method of claim 2 in which the pulling force is applied with a pair of oppositely rotating rollers which draw in the skin therebetween and pull it off the poultry portion.

4. The method of claim 1 in which the poultry body is supported on the saddle such and the saddle oriented such that following the step of detaching meat attached to the ribs in the back area and from the shoulder blades, meat thus far detached from the poultry portion is caused to hang downwardly therefrom under the effect of gravity.

5. The method of claim 2 in which the poultry body is supported on the saddle such and the saddle oriented such that following the step of detaching meat attached to the ribs in the back area and from the shoulder blades, meat thus far detached from the poultry portion is caused to hang downwardly therefrom under the effect of gravity.

* * * * *